United States Patent [19]

Willeitner

[11] 4,359,329
[45] Nov. 16, 1982

[54] OIL SEPARATOR FOR COMPRESSORS OF HEAT PUMPS AND CHILLERS

[75] Inventor: Eberhard Willeitner, Utting a.Ammersee, Fed. Rep. of Germany

[73] Assignee: M.A.N. Maschinenfabrik Augsburg-Nurnburg A.G., Munich, Fed. Rep. of Germany

[21] Appl. No.: 252,744

[22] Filed: Apr. 10, 1981

[30] Foreign Application Priority Data

Apr. 12, 1980 [DE] Fed. Rep. of Germany ....... 3014148

[51] Int. Cl.³ .............................................. B01D 45/12
[52] U.S. Cl. ....................................... 55/186; 55/208; 55/320; 210/DIG. 5
[58] Field of Search ........................ 55/178, 184–187, 55/208, 320, 321; 210/DIG. 5

[56] References Cited

U.S. PATENT DOCUMENTS

| | | | |
|---|---|---|---|
| 1,782,783 | 11/1930 | Kotzenbue | 55/186 |
| 2,868,315 | 1/1959 | Chapel et al. | 55/186 |
| 2,960,234 | 11/1960 | Fredrickson | 210/DIG. 5 |
| 3,255,574 | 6/1966 | Glasgow | 55/174 |
| 3,492,787 | 2/1970 | McMinn | 55/208 |
| 3,917,474 | 11/1975 | Heckenhamp et al. | 55/185 X |
| 3,955,945 | 5/1976 | Bauer | 55/185 X |

*Primary Examiner*—John Adee
*Attorney, Agent, or Firm*—Alan H. Levine

[57] ABSTRACT

An oil separator comprising an elongated horizontally oriented container having an inlet near one end through which an oil-refrigerant vapor mixture can be introduced into the container, the container having outlets near its other end for the separated oil and refrigerant vapor, respectively. A deflector is located within the container in the flow path of the oil-vapor mixture, and there is a demister within the container downstream of the deflector. The bottom of the container constitutes an oil sump, and a partition within the container has an opening in its portion within the sump, the partition carrying the demister at a location above the oil level in the sump. The cross-sectional flow area of the demister is smaller than the surface area of the partition above the oil level. The length of the demister is sufficient to permit oil drops in the oil-vapor mixture to unite with oil clinging to the demister mesh. Two spaced apart demisters may be used. In an alternative embodiment, a second container extending into the elongated container has the oil-vapor inlet and a perforated bottom above the sump oil level. Within the second container is an annulus, a stilling chamber, and a demister downstream of the annulus. A heater and/or a cooling device may be located within the oil sump.

3 Claims, 5 Drawing Figures

OIL SEPARATOR FOR COMPRESSORS OF HEAT PUMPS AND CHILLERS

This invention relates to an oil separator for compressors of heat pumps and chillers, including a container having at least one filter for separating the oil from a refrigerant-oil-vapor mixture. The separated oil is collected in the container from which it is ducted to the compressor, and the vapor mixture passes through the container above the oil sump level.

Oil separators are used to separate from the refrigerant the oil that escapes from the compressor with the refrigerant. The separated oil is returned to the compressor, while the now oil-free refrigerant is ducted to a condenser.

An oil separator is known consisting of a cylindrical, vertically arranged container into the upper end of which the vapor mixture is introduced, the mixture exiting at about the center of the container through a pipe. In its downward flow through the container, the vapor mixture is deflected along a tortuous path by means of baffles, to improve oil separation, until eventually it is deflected vertically upwards, at the level of the discharge pipe, and carried through a filter arranged around the discharge pipe.

The known device is, however, encumbered by a disadvantage in that the flow of vapor and oil drops, falling as they do under the force of gravity, take the same direction of movement and meet several times in their respective courses, permitting the vapor and the drops to remix over and over again. Additionally, the newly separated oil collecting in the lower part of the container is carried away rapidly, taking the refrigerant with it into the compressor (cf. German printed patent specification DE-OS No. 25 22 764).

It is necessary to separate, to a maximum degree, the refrigerant and the oil that united in the compressor before they reach the condensor or the compressor. Should the oil not be adequately separated from the refrigerant, a dual disadvantage ensues in that, first, the oil is drawn away from the compressor, and second, the heat exchanger surface areas of the condensor and evaporator are contaminated with oil thereby impairing the heat exchange. If, on the other hand, too much refrigerant should remain in the oil, the resulting foaming is injurious to the proper operation of the compressor.

It is a broad object the present invention to provide an oil separator of the type described having a high degree of separation efficiency.

It is a particular object of the present invention to provide a horizontally extending container in which the vapor mixture and the separated oil flow horizontally along the longitudinal direction of the container, and to arrange a separator in the stream of the vapor mixture plus, downstream of the separator, a filter or demister.

This configuration provides an advantage over known separating techniques in that the bulk and the cost of the construction is reduced while the separation efficiency is high. The separator first separates the larger oil drops from the vapor mixture, preventing the filter or demister downstream of the separator, which serves a fine separating function, from being contaminated with oil and fouled right away. The third separating function takes place during the long horizontal travel of the vapor mixture within the separating container, when the oil droplets, which have horizontal momentum and simultaneously are subjected to gravitational force, having sufficient time to move out of the field of flow, in their parabolic path, to remain under the influence of only the gravitational field.

When the oil droplets are separated from the mixture, the oil so separated still carries a certain amount of refrigerant. The oil-trapped refrigerant vapor will then separate in the oil sump, where it rises in the form of vapor bubbles. In this respect, the long horizontal flow path of the oil also affords the refrigerant vapor sufficient time to fizz out from the oil sump until nearly saturated.

The use of rather simple means, therefore, ensures adequate separation of the two mixed components, one from the other, to largely keep the components of the system which are contacted by refrigerant vapor from being contaminated with oil, and equally ensures adequate cooling of the compressor with nonfoaming oil. As a result, heat pumps or chillers can be manufactured that are simpler and less expensive to make, and that give high efficiency with less maintenance.

An advantageous feature of the present invention involves the demister being supported in a partition arranged perpendicularly to the longitudinal centerline of the container, the partition being formed with an opening in its lower end which is submerged in the oil sump. This very simple configuration provides a threefold advantage in that it serves to carry the demister, it prevents splashing in the oil sump, and it prevents the incoming oil drops, which still carry a good deal of refrigerant vapor, from reaching the oil drain pipe along the shortest route, thereby giving the refrigerant vapor time to bubble out of the oil. Considering that the partition dividing the container into chambers has an opening only near the bottom of the container, the oil is prevented from flowing from one chamber into the other, except in the lower region of the container.

A further advantageous feature of the present invention involves a heater provided in the oil sump to make the refrigerant vapor bubble out of the oil even when the system is at rest.

It is a further object of the present invention to improve the separating efficiency by selecting a demister flow area that is smaller than the surface area of the partition above the oil level. This enables the vapor issuing from the demister to develop peripheral eddies as a result of the windened space downstream, which provides the system with additional separation capacity. Inasmuch as too small a demister flow area should be avoided to prevent excessive pressure difference between the chambers formed by the partition and the demister, such pressure difference possibly causing unlike oil levels in the chambers, the flow area should be held only so much smaller than the surface area of the partition above the oil level that the vapor issuing from the demister is allowed space to escape laterally around the demister, or at least on its sides, in which space the vapor mixture can form eddies as intended.

According to a further feature of the present invention, the demister is given sufficient length in the direction of flow of the vapor mixture that the droplets carried in the flow can combine with the oil clinging to the demister mesh to form larger drops, so that the small, light-weight drops unite to form larger, heavier drops which when issuing from the demister have a better chance of falling down.

If necessary, several demisters can be combined in series such that the distance allowed between them permits drops formed in the preceding demister to be separated by gravity. In this manner, increasingly fine separation makes for excellent separation efficiency.

According to a further feature of the present invention, an extremely high degree of separation, if desired, is achieved by again providing a horizontally extending container, except that a second container having a perforated bottom projects into the first container at one of its ends at a point above the oil level, the second container having a centrifugally separating annulus followed by a decelerating chamber and a demister. In this configuration, the high separation efficiency of centrifugal separation is exploited in conjunction with the good separating action provided for the refrigerant vapor from the oil sump.

The accompanying drawings illustrate embodiments in accordance with the present invention, in which.

Figure 1:
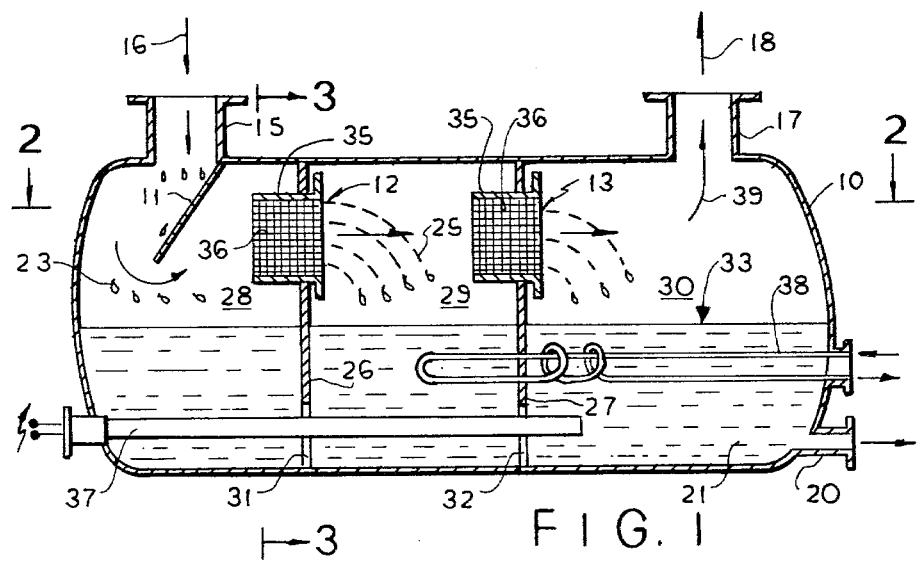
FIG. 1 is a longitudinal cross-sectional view of an oil separator.

With reference now to FIG. 1, an oil separator consists of a container 10 with a deflector 11 arranged therein, and two demisters 12 and 13. The container 10 is a horizontally arranged oblong cylinder with closed ends, having an inlet pipe 15 at one end for the refrigerant-oil-vapor mixture 16, and an outlet pipe 17 at its other end for the refrigerant vapor 18. Also provided is a drain pipe 20 for the separated oil collecting in the container, this drain pipe being arranged in the lower portion of that end of the container which is opposite the inlet pipe 15. In order to achieve initial deflection of the vapor 16 in a very simple fashion, the inlet pipe 15 can be arranged, as shown in the drawing, to open into the upper portion of the container 10 rather than into its front end.

The mixture 16 entering the container 10 through the inlet pipe 15 is first deflected by the deflector 11 such that the larger oil drops 23 are separated and direct access to the demister 12 is prevented to keep the demister 12 from being contaminated and fouled with oil. Expansion of the gas when entering the larger space causes the velocity of flow to decrease and the effect of gravity on the oil drops to grow in significance over the momentum imparted by the flow. The relative arrangement of the inlet and outlet pipes 15 and 17 causes the vapor to flow along an essentially horizontal path inside the container. With this arrangement the oil drops can, at a relatively low velocity of flow, fall more readily clear of the flow by virtue of gravity both inside the demisters 12 and 13 and in the zone of free flow. In order not to interrupt the parabolic path of travel 25 of the oil drops leaving the first demister, the second demister 13 is arranged at a distance from the first demister 12 such that the oil drops can drop into the oil sump rather than be caught by the second demister.

The container is divided into three chambers 28, 29, and 30 by two partitions 26 and 27. These partitions 26 and 27 serve to support the demisters 12 and 13 and also to prevent splashing in the sump 21 should the system be agitated especially at the time it is started. Splashing would impair the separating action. The oil in the various chambers 28 to 30 communicates through openings 31 and 32 in the partitions 26 and 27.

Figure 2:
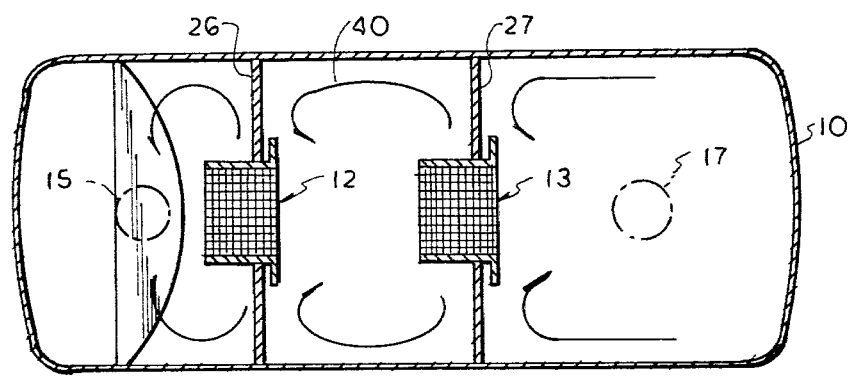
FIG. 2 is a horizontal cross-sectional view taken along line 2—2 of FIG. 1.

The demisters 12 and 13 consist of cylindrical sleeves 35 with wire mesh 36 arranged therein. The flow area of the sleeve 35 is smaller than the surface area of the respective partition 26 or 27 projecting above the level of oil in sump 21. As a result, the demisters 12 and 13 do not extend to the container wall, allowing the stream of vapor, after it has passed through a demister, to expand in the succeeding chamber and form peripheral eddies 40 (FIG. 2). The eddies 40 augment the separating action. In order to minimize the overall height of the container 10, it is sufficient if the demisters 12 and 13 do not extend across the full width of the container and that eddies are allowed to form on the sides only, as shown in FIG. 2. Deflection 39 preceding the exit through the pipe 17 ultimately causes further separation of any oil still remaining in the stream of vapor 18.

Figure 3:
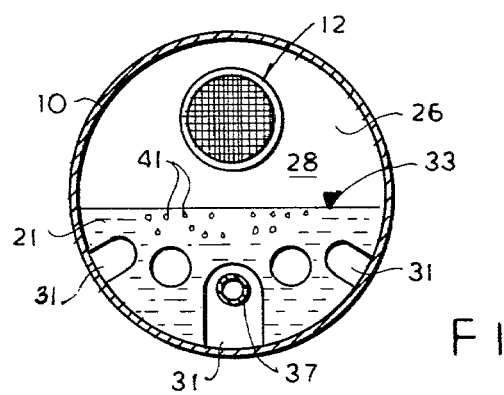
FIG. 3 is a transverse cross-sectional view taken along line 3—3 of FIG. 1.

FIG. 3 is a cross-section of the chamber 28 providing a closer view of the openings 31 in the partition 26. The openings 31, the place of which can optionally be taken by a single, larger-sized opening, are arranged near the bottom of the container 10. This arrangement serves to prevent the incoming oil drops, which still carry a certain amount of refrigerant, from proceeding directly into the next chamber, and thus allow the trapped refrigerant time to surface from the oil sump 21 in the form of bubbles 41. This effect is assisted also by the long path the flow follows through the entire length of the container 10. As the temperature of the oil rises, it will decreasingly be capable of picking up refrigerant vapor. The separator is therefore provided with a heating rod 37 which makes sure the refrigerant vapor will bubble to the surface even when the system is at rest.

Figure 4:
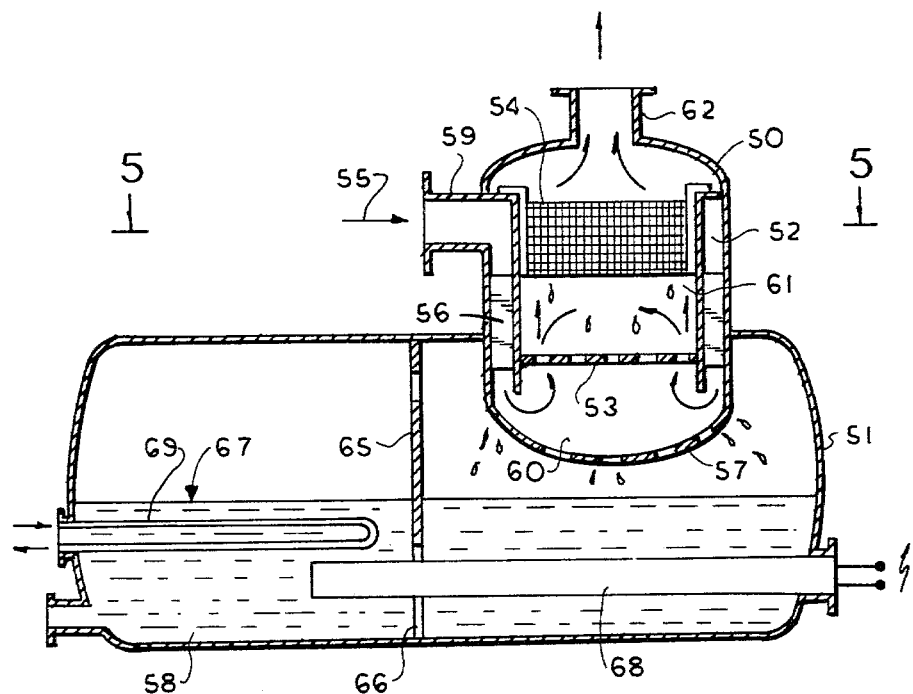
FIG. 4 is a longitudinal cross-sectional view of an alternative embodiment of an oil separator.
Figure 5:
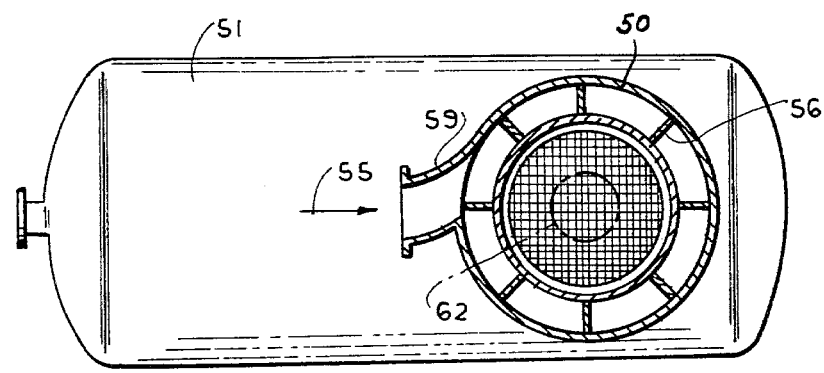
FIG. 5 is a horizontal cross-sectional view taken along line 5—5 of FIG. 4.

FIGS. 4 and 5 illustrate an alternative embodiment in which the separating devices of the first embodiment have been replaced with a second container 50 which projects into the first, horizontally arranged container 51 and has a centrifugally separating annulus 52 as well as a distribution plate 53 and a demister 54.

The refrigerant-oil mixture 55 enters the annulus 52 tangentially at the upper end of the second container 50. The lower end of the annulus 52 accommodates a row of blades 56 imparting whirl to the mixture as it passes through the annulus. In accordance with the law of centrifugal force, the oil collects on the outer wall while the refrigerant vapor gathers farther inwards. Gravity causes the oil to flow along the wall and into the sump 58 through the perforated bottom 57 of the second container 50, while the oil-depleted mixture is deflected upwards through 180°, upon issuing from the annulus 52, into a stilling chamber 60. This change of direction again causes oil droplets to segregate. In the stilling chamber 60 the mixture is considerably decelerated. In order to ensure uniform distribution of the vapor, which still carries a moderate amount of tangential momentum, within the interior space enclosed by the annulus 52, a perforated plate 53 is located in its path. Having passed through the demister 54 the refrigerant vapor, now low in oil, is finally ducted to the condenser through an outlet pipe 62.

The separation achieved by the first embodiment of FIG. 1 by eddy formation and the long path of flow is replaced, in the embodiment of FIG. 4, by centrifugal separation in the annulus 52. This somewhat complex design is suitable for applications imposing stringent requirements for separation of the vapor content. Segregation of the refrigerant vapor from the oil sump 58 is achieved in the same manner as with the device of FIG. 1.

In the embodiment of FIG. 4, one or more partitions 65 having low-level openings 66 can also be provided to prevent movement of the oil level 67 and allow the second container 50 to be installed in the first container 51 as close as possible to the oil level 67 so as to reduce the overall height.

In both cases the separators are designed to permit heating rods 37 or 68 and cooling coils 38 or 69 to be readily installed without involving additional manufacturing effort.

The invention has been shown and described in preferred form only, and by way of example, and many variations may be made in the invention which will still be comprises within its spirit. It is understood, therefore, that the invention is not limited to any specific form or embodiment except insofar as such limitations are included in the appended claims.

I claim:

1. An oil separator for compressors of heat pumps and chillers, comprising:

an elongated horizontally oriented container having an inlet near one end through which an oil-refrigerant vapor mixture can be introduced into the container, the container having outlets near its other end for the separated oil and refrigerant vapor, respectively, the bottom of the container constituting a sump within which oil accumulates, a deflector within the container located in the path of flow of the oil-vapor mixture, a partition within the container downstream of the deflector, the partition extending transverse to the longitudinal direction of the container and across the entire cross-sectional area of the container, the partition having an opening in its lower portion located within the sump, a demister carried by the partition at a location above the level of oil in the sump, such that the oil-vapor mixture must flow through the demister to reach the outlets, the cross-sectional flow area of the demister being smaller than the surface area portion of the partition located above the level of oil in the sump, the demister flow area being large enough to prevent a pressure drop across the partition.

2. An oil separator as defined in claim 1 wherein the demister has a length, along the direction of flow of the oil-vapor mixture through the container, sufficient to permit oil drops carried by the oil-vapor mixture to unite with oil clinging to the demister mesh to form larger size drops.

3. An oil separator as defined in claim 1 including two demisters within the container spaced apart in the direction of flow through the container, the distance between the demisters being large enough so that oil drops leaving the upstream demister do not reach the downstream demister.

* * * * *